May 12, 1931.  L. E. BLOOD ET AL  1,805,437
WOOD PLANING MACHINE
Filed Aug. 12, 1929  2 Sheets-Sheet 1

Inventors:
Lawrence E. Blood
John B. Wiard
by Emery, Booth, Varney & Townsend Attys

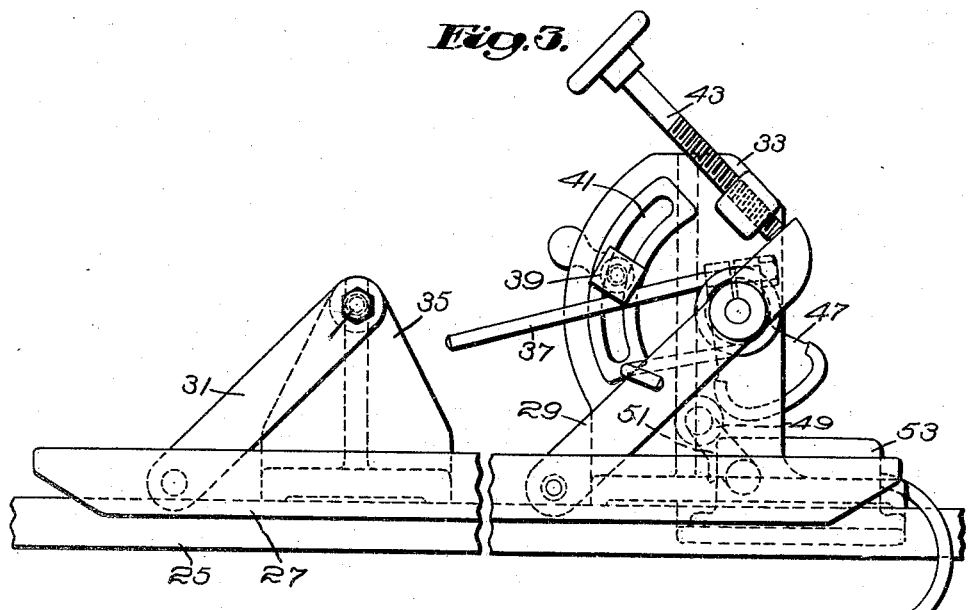
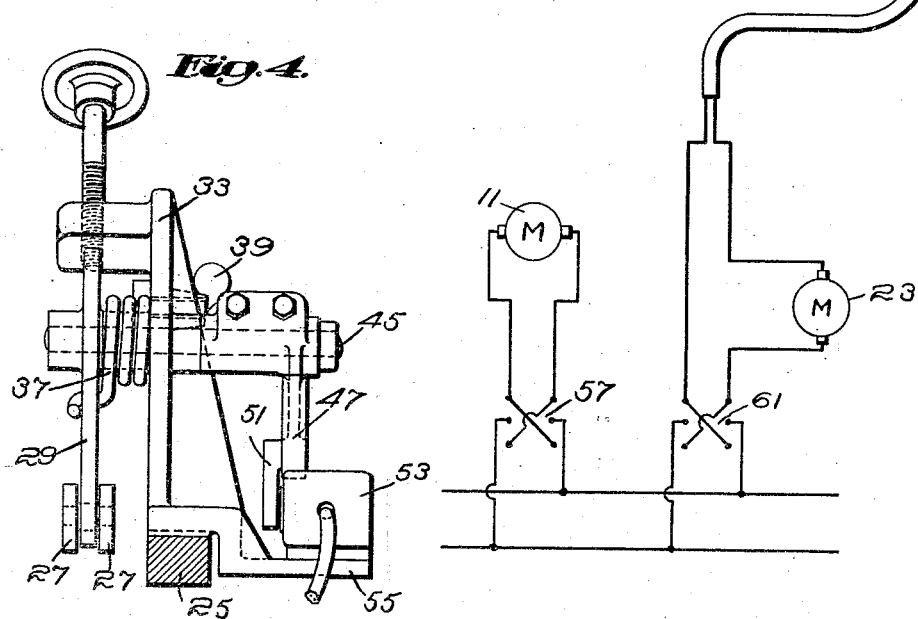

Patented May 12, 1931

1,805,437

UNITED STATES PATENT OFFICE

LAURENCE E. BLOOD, OF BOSTON, AND JOHN B. WIARD, OF BROOKLINE, MASSACHUSETTS, ASSIGNORS TO S. A. WOODS MACHINE COMPANY, OF BOSTON, MASSACHUSETTS, A CORPORATION OF MASSACHUSETTS

WOOD PLANING MACHINE

Application filed August 12, 1929. Serial No. 385,328.

This invention relates to wood planing machines, and the object is to provide in such a machine an improved construction and arrangement of parts facilitating their use particularly with reference to stoppages and jams due to improper passage of the boards therethrough.

Our invention will be well understood by reference to the following description of an illustrative embodiment thereof shown by way of example merely in the annexed drawings, wherein:—

Fig. 3 is a broken side elevation of the guide and stop mechanisms intervening between the planer proper and the feed table and has associated therewith a partial wiring diagram; and Fig. 4 is a side elevation of the same as seen from the right of Fig. 3.

Figure 1:
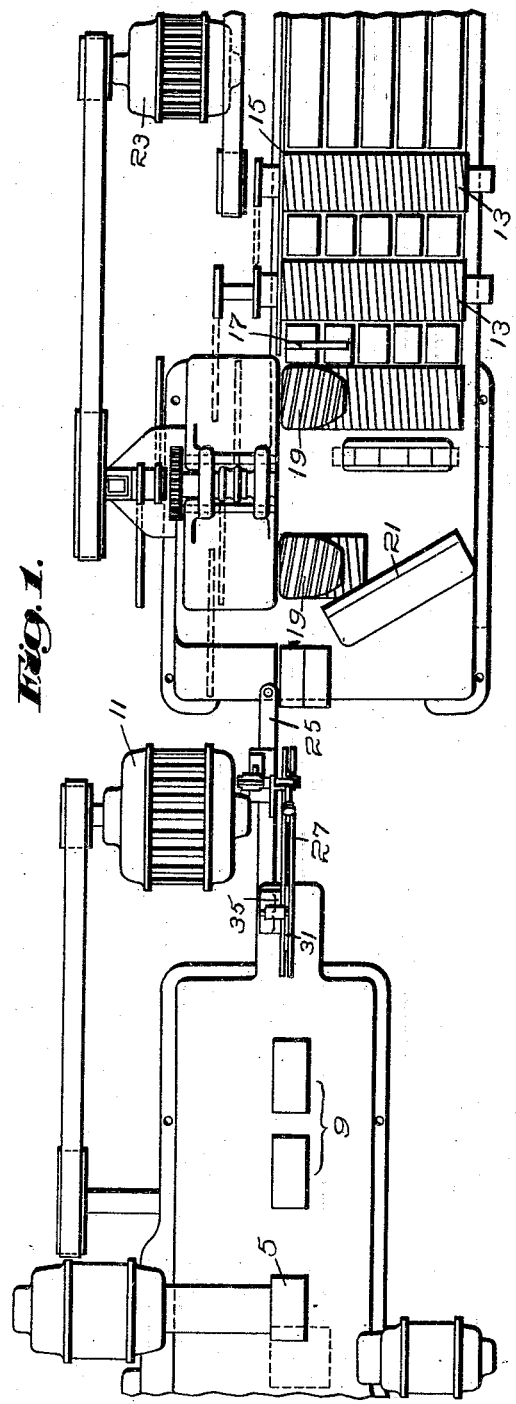
Fig. 1 is a simplified and diagrammatic plan view of a portion of a planer and associated feed table.
Figure 2:
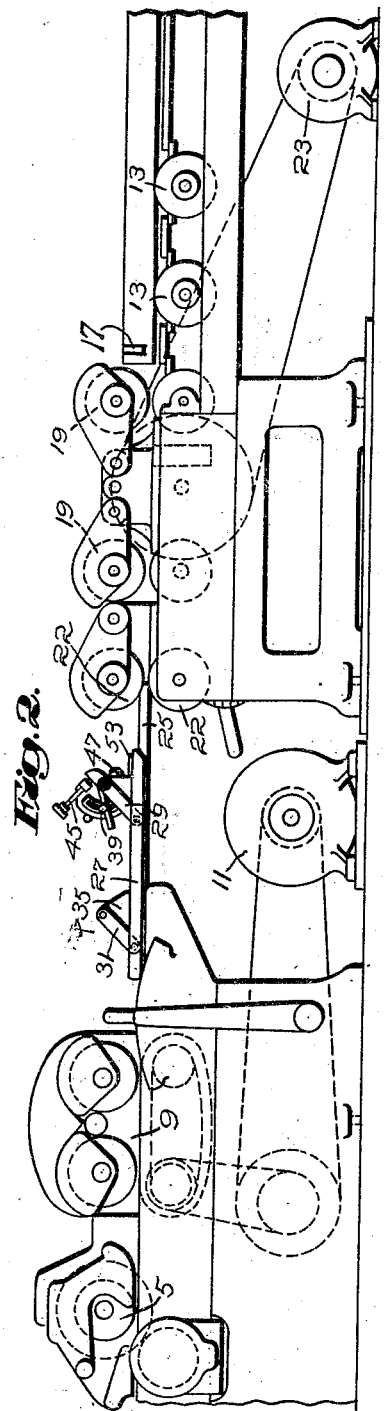
Fig. 2 is a similar side elevation.

Referring to Figs. 1 and 2 of the drawings, we have shown at the left of those figures a portion of the planer proper (which word we use in a generic sense to include not only the machines technically known as planers but surfacers, matchers, molders and the like) having a top head 5, herein shown as having an integral drive from electric motor 7 beneath which head the work is advanced by the feed mechanism 9, which may be of the traveling bed type as shown in the patent to Blood 1,704,677, this feeding mechanism being driven herein by the reversible electric motor 11. It will be understood that the planing machine may embody the customary bottom head, side heads, feeding-out rolls, profiler heads, etc. A machine of this type may be fed by hand, but particularly when operated at high speeds it is usual to incorporate, essentially as a part of the machine and belted thereto to take power from its driving shaft, a feeding means in the nature of a feed table adapted to deliver a series of boards to the feeding rolls 9. Such a feed table runs faster than the feeding means 9 to provide an uninterrupted stream of boards.

To the right of Figs. 1 and 2 we have shown a suitable feed table which may embody the spirally ribbed rolls 13 adapted to feed boards laterally against a guide or fence 15 in the line of feed. The boards, one or more at a time, are thrown carelessly on the table and acted on by the rolls 13, and the fence 21 prevents their passing forward except along the guide 15. A suitable projecting stop 17 permits only the lowermost board to move over against this guide 15 and beneath the tapered overhanging rolls 19, or so-called pineapple rolls, which in cooperation with the ribbed rolls underneath seize the board, press it firmly against the guide and discharge it rapidly past the restraining fence 21 through the feed couple 22 and to the feed mechanism 9 of the planer proper.

In accordance with our invention we provide for the feed table an independent, separately controllable guide providing advantages in use as will hereinafter appear. We have herein shown a separate reversible electric motor 23 which delivers power to the mechanism of the feed table by the connections illustrated in a general way in Fig. 1 and not necessary herein to describe in detail. The feed table may deliver the boards along the back guide 25 interposed between the table and the planer under a yieldable top guide 27, herein shown as comprising a pair of bars suspended by links 29 and 31 from stands 33 and 35 respectively, the stands being supported on guide 25. A spring 37 may be interposed between stand 33 and link 29 yieldably to press the top guide 27 downward, and the tension of this spring may be adjusted by means of the bolt 39 working in the arc-shaped groove 41 in the stand. The upper end of link 29 may be extended to contact with the adjustable screw 43 mounted in a lug on stand 33 and providing a stop limiting the downward movement of guide 27.

In the embodiment of our invention herein shown we provide an automatic stop operating in such manner that when any abnormal conditions in the feed occur, the power will be shut off from motor 23. In the embodiment of the invention shown the abnormality is an undue thickness of work passing to the planer such as would be occasioned by one board riding up on top of another and the top guide 27 is utilized as a feeler to detect this condition. Herein a shaft 45 on which link 29 is fast turns in stand 33 and extends to the opposite side thereof and has clamped thereto for angular adjustment thereabout a suitable radially extending wiper arm 47 adapted to cooperate with a cam roll 49 on an actuating arm 51 operating a switch 53 in the circuit of motor 23. The switch mechanism may be supported on a shelf or bracket 55 projecting from stand 33. The parts being adjusted, for example to the position shown in Fig. 3, if the top guide 27 is unduly lifted, wiper 47 swings clockwise, depressing arm 51 and throwing open the switch and stopping the motor and the feed table driven thereby while permitting the feed 9 of the planer proper to continue in motion. There is thus no danger of one board piling up on top of another and jamming into the feed mechanism 9 while that mechanism may, if it is within its power, continue to draw forward the board engaged therewith, clearing the jam and not interrupting the action of the planing machine. If the jam is cleared away, the top guide 27 will descend, the motor 23 may again be made to function and the rapidly operating feed table will feed forward a board to catch up with the preceding one in the planer. The feed motor 11 may be stopped, reversed by means of switch 57 or otherwise manipulated to help clear out the jam without embarrassment from the action of the feed table which is out of action independently of the feed 9.

The control means 61 is preferably so constructed that the circuit to motor 23 may be completed, by-passing switch 57, and the motor 23 may be temporarily operated independently of the switch 57 being open. Thus the motor 23 in some instances might be reversed to draw backwardly the board causing the jam, or it could be repeatedly reversed so that a board under control of the feed table could be reciprocated to serve as a hammer to help clear out the jam ahead.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

Claims:

1. In combination with a planing mechanism including planing knives and a feeding means for traversing a board past the same, an overrunning feeding means for delivering boards from a supply to said first feeding means, and means individually controllable for independently driving either or both of said feeding means.

2. In combination with a planing mechanism including planing knives and a feeding means for traversing a board past the same, an overrunning feeding means for delivering boards from a supply to said first feeding means, a drive for said first means, and a separately controllable and reversible drive for said second means.

3. In combination with a planing mechanism including planing knives and a feeding means for traversing a board past the same, an overrunning feeding means for delivering boards from a supply to said first feeding means, means for driving said feeding means, and means including a feeler interposed between said feeding means and adapted to be actuated on occurrence of abnormal conditions in the passage of boards past the same to interrupt the drive of said overrunning feeding means while permitting continued operation of the other.

4. In combination with a planer and its feeding mechanism, a motor driving said mechanism, a relatively fast feed table delivering to said mechanism, a driving motor therefor, a yieldable guide past which the boards move between the planer and table, and an automatic stop for the feed table motor actuated on abnormal movement of the guide.

5. In combination with a planer and its feeding mechanism, a motor for driving the mechanism, a relatively fast feed table delivering to said mechanism, a reversible electric motor driving the table, a switch in the circuit of said motor, a feeler between planer and table adapted to be displaced by an abnormally fed board to actuate the switch, and controlling mechanism for the motor including means for by-passing the switch.

6. In combination with a feed table adapted to bring boards into a line of feed and feed them forward successively to a planing machine, an electric motor for driving the same, a yielding top guide beneath which the boards are fed comprising a bar suspended from links, a switch for the circuit of said motor having an operating arm and a wiper turning with one of said links for acting on said arm.

7. In combination with a feed table adapted to bring boards into a line of feed and feed them forward successively to a planing machine, an electric motor for driving the same, a yielding top guide beneath which the boards are fed comprising a bar suspended from links, a switch for the circuit of said motor having an operating arm, one of said links having an extended pivot and a wiper secured on said pivot for angular adjustment adapted to act on said arm on abnormal movement of the guide.

8. A controlling means for a planer feed table comprising a stand for attachment to a back guide, a transverse shaft pivoted therein, a link on said shaft for suspending a top guide, a spring interposed between said link and stand, means for adjusting the spring, an adjustable stop for the link on said stand, and a wiper on the end of the shaft adapted to actuate a power control device for the table, said stand having provision for supporting that portion of said device which is directly actuated.

9. In combination with a feed table adapted to bring boards into a line of feed and feed them forward successively to a planing machine, an electric motor for driving the same, a yielding member past which the boards are fed, a wiper arm turned in the yielding movement of the member, and a switch for the circuit of said motor having an operating arm acted on by said wiper on abnormal movement of the member.

In testimony whereof, we have signed our names to this specification.

LAURENCE E. BLOOD.
JOHN B. WIARD.